United States Patent [19]

Bernard et al.

[11] Patent Number: 4,799,780

[45] Date of Patent: Jan. 24, 1989

[54] ABERRATED SUPPRESSOR MIRROR

[75] Inventors: Jay M. Bernard, Torrance; Richard A. Chodzko, Rancho Palos Verdes; Timothy J. Bixler, Gardena, all of Calif.

[73] Assignee: The Aerospace Corporation, El Segundo, Calif.

[21] Appl. No.: 6,413

[22] Filed: Jan. 23, 1987

[51] Int. Cl.$^4$ .................................................. G02B 5/08
[52] U.S. Cl. ...................................... 350/600; 372/99; 350/602
[58] Field of Search ............... 350/600, 611, 321, 602; 372/93, 99; 356/350

[56] References Cited

U.S. PATENT DOCUMENTS 4,492,431 1/1985 Eitel et al. .......................... 350/611

Primary Examiner—Jon W. Henry
Attorney, Agent, or Firm—William J. Burke

[57] ABSTRACT

The invention described herein is a reverse wave suppressor mirror which is purposefully aberrated in order to decrease its sensitivity to tilt when compared to a conventional reverse wave suppressor mirror.

3 Claims, 2 Drawing Sheets

ABERRATED SUPPRESSOR MIRROR

STATEMENT OF GOVERNMENT INTEREST

The invention described herein may be manufactured and used by or for the Government of the United States for governmental purposes without the payment of royalty therefor.

BACKGROUND OF THE INVENTION

1. Field of the Invention

This invention relates to the use of ring lasers and in particular to the use of a mirror to suppress one of the two outputs typically produced by a ring laser.

2. Description of the Prior Art

As shown in FIG. 1, a ring laser typically emits light in two separate directions. Since some applications of these lasers require only one output, the other output must be suppressed. The unwanted output has been named the "reverse wave", and the desired output the "forward wave".

Two techniques have evolved to accomplish reverse wave suppression. One involves polarizing elements inside the laser cavity, and the other uses a mirror outside the laser cavity to direct one of the outputs back into the cavity in the opposite direction. The former technique is limited to ring lasers of relatively low power, because polarizing elements cannot survive high light intensities. The reverse wave suppressor mirror technique can be used for all types of ring lasers. The use of mirrors is particularly desirable because the mirror can reinject the reverse wave in the forward direction, thus reinforcing the forward wave.

Conventional reverse wave suppressor mirrors are designed to match the reverse wave radius of curvature to within a fraction of the wavelength of the laser light. Smooth, high tolerance mirrors are selected for this purpose.

Conventional reverse wave suppressor mirrors are manufactured to surface tolerances of tens of nanometers, as are all of the other mirrors in the laser cavity. The surface profile of a conventional reverse wave suppressor mirror is shown in FIG. 2a. Scratches on the surface of a conventional mirror may be from 0.5 to 2 nanometers deep and separated by 0.1 to 0.5 millimeters.

There are at least two significant shortcomings in using conventional mirrors to suppress the reverse wave. The first shortcoming is that conventional mirrors are extremely sensitive to angular misalignment. Misalignment can be caused by tilting the mirror, by undesirable aberrations on the mirror surface or by variations in the optical bench structure supporting the mirrors.

Misalignment can significantly reduce resonator performance. For example, the figure of merit for the performance of the ring laser is known as the far-field brightness, $P_F/n^2$. That figure is the fraction of the total laser power contained in the central spot of the focused beam. The experimental data displayed in FIG. 3 shows a factor of two decrease in far-field brightness with 150 microradian tilt of the conventional suppressor mirror. Misalignment can also generate significant excess heat, thereby increasing cooling requirements.

The second significant shortcoming in using conventional mirrors to suppress the reverse wave is the complexity of manufacturing and mounting such mirrors. As shown in FIG. 3, conventional mirrors rapidly lose effectiveness when tilted, and tilt can be caused by movement of the mirror.

There are certain manufacturing and mounting techniques that can be used to reduce the movement of the reverse wave suppressor mirror. For example, a corner cube retroreflector can be used as a reverse wave suppressor mirror to reduce sensitivity of the mirror to tilt. However, since the corner cube involves three reflections and displaces all three pieces of the reverse wave upon retroreflection, it can only be used on ring lasers whose reverse output has three-fold symmetry. Furthermore, corner cubes consist of three precisely-aligned, aberration-free conventional mirrors, and their construction exceeds the cost and complexity of conventional reverse wave suppressor mirror systems.

It is therefore an object of this invention to provide a reverse wave suppressor mirror system which reduces the sensitivity of the system to tilt.

It is also an object of this invention to significantly reduce the cost and complexity of the manufacture and mounting of reverse wave suppressor mirror systems.

SUMMARY OF THE INVENTION

This invention discloses a novel reverse wave suppressor mirror which greatly enhances ring laser performance over conventional mirrors by purposefully aberrating the surface of the mirror with random undulations with a height on the order of the wavelength of the light to be suppressed and with a width on the order of a fraction of the diameter of the beam of the reverse wave. For laser light, with a wavelength of approximately 3 microns and a beam diameter of about 2 centimeters, the undulations will be 3 to 10 microns high and a few millimeters wide.

DETAILED DESCRIPTION OF THE PREFERRED EMBODIMENT

Figure 1:
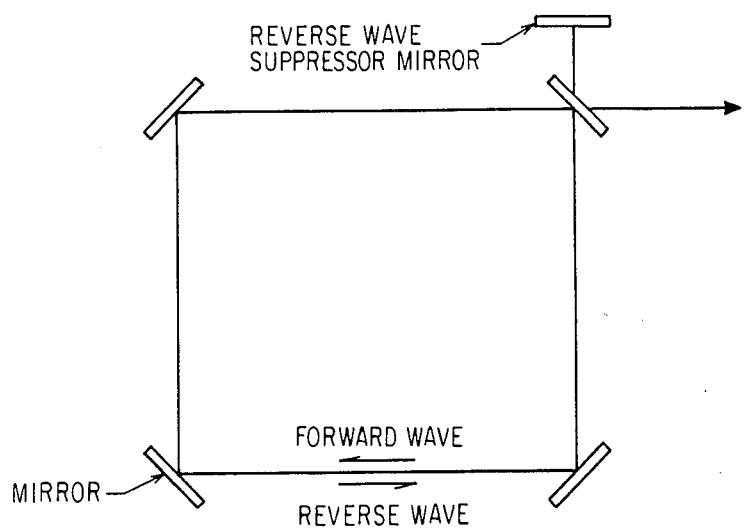
FIG. 1 is a schematic of a simple ring laser showing the forward wave and the reverse wave.
Figure 2A:
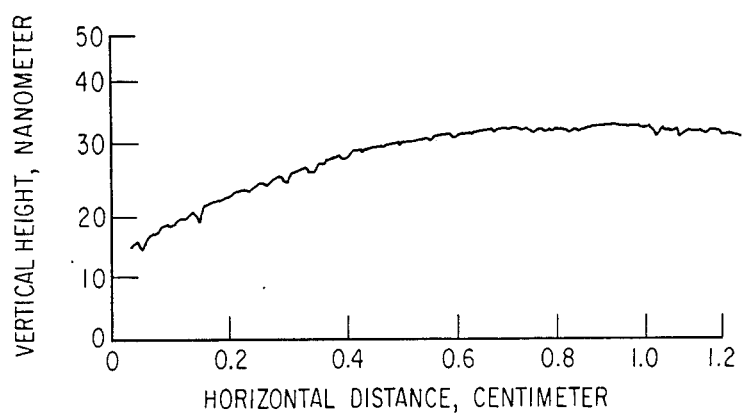
FIG. 2a is a surface profile of a conventional mirror and FIG. 2b is a surface profile of an aberrated mirror.
Figure 2B:
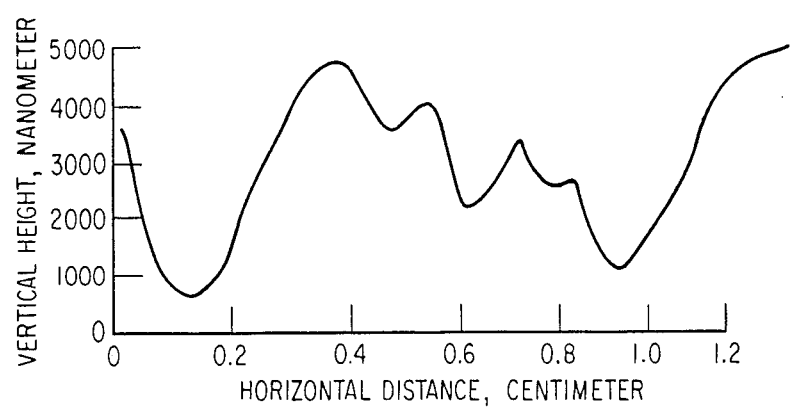

FIG. 2a and FIG. 2b are schematics showing the surface profile of a conventional mirror and an aberrated mirror, respectively. The profile for the aberrated mirror consists of randomly placed hills and valleys over the entire mirror surface, while the profile of the conventional mirror is the same along any of its diameters. The height of these undulations is on the order of the wavelength of the light to be suppressed. The width of the undulations is a fraction of the diameter of the beam of the reverse wave that strikes the mirror.

In a preferred embodiment, for laser light with a wavelength of 3 microns and a beam diameter of about 2 centimeters, the aberrations introduced into the surface of the aberrated mirror will be mounds and depressions 3 to 10 microns in height, a few millimeters wide, and randomly placed. The departure of the aberrated surface shown in FIG. 2b from the nominally-flat surface of the conventional mirror shown in FIG. 2a is both orders of magnitude taller and significantly narrower for the aberrated mirror than it is for the conventional mirror.

Figure 4:
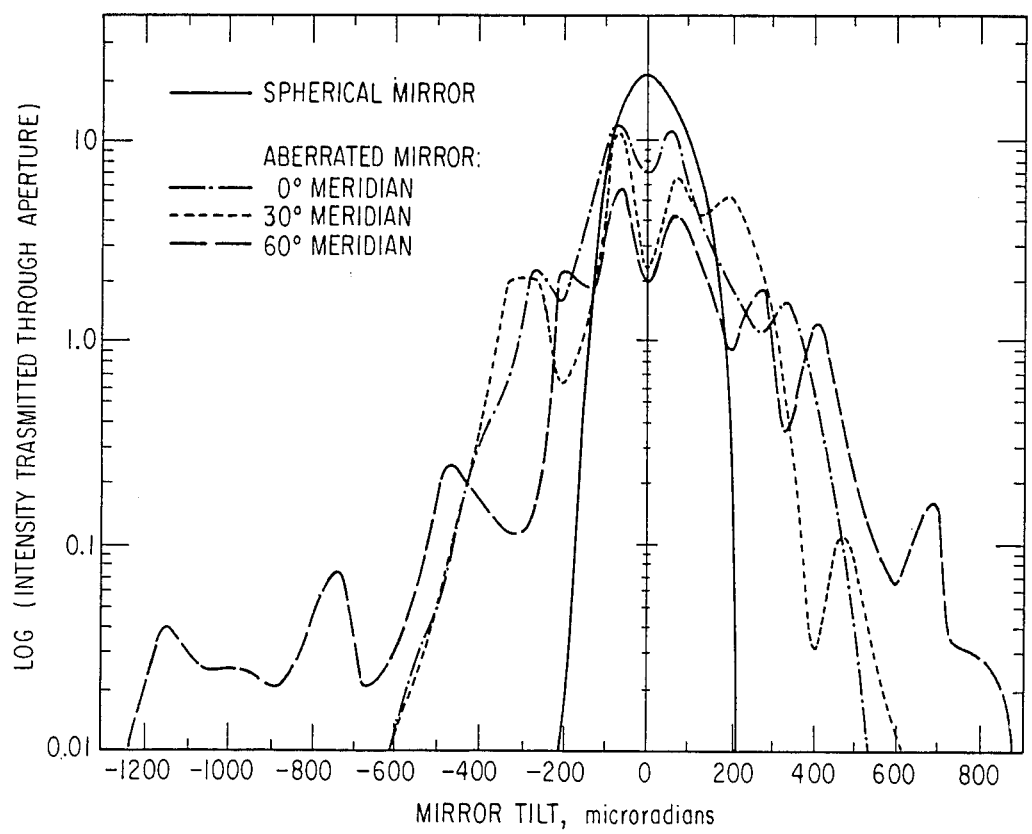
FIG. 4 is a graph of reflectance of an aberrated mirror and a conventional mirror.

As shown in FIG. 4, an aberrated mirror spreads out a reflected beam and redistributes its intensity distribution nonuniformly when compared to a conventional mirror. This property is disadvantageous in conventional mirror usage, as an image would be hopelessly blurred by such a mirror. As a reverse wave suppressor mirror, however, an aberrated mirror out-performs any conventional mirror in terms of insensitivity to tilt. Effective suppression of the reverse wave is provided by the aberrated mirror if only 5 to 10 percent of the reverse wave energy is reflected into the proper direction.

Figure 3:
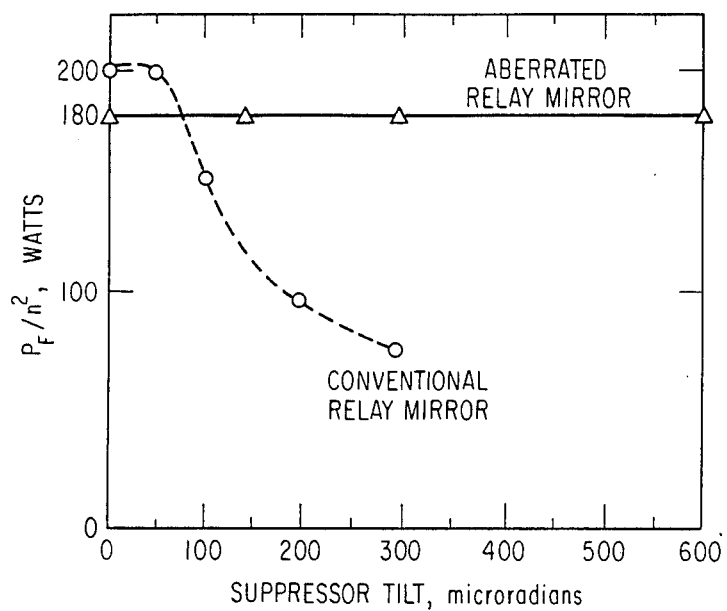
FIG. 3 is a graph representing the effect of suppressor mirror tilt on forward-wave far-field brightness for a conventional mirror and an aberrated mirror.

FIG. 3 compares the performance of the aberrated mirror with that of a conventional mirror. The performance of an aberrated mirror is reduced by a maximum of about 10 percent over the performance of an untilted conventional mirror. However, the aberrated mirror has superior performance at all angles of tilt above 75 microradians. Some applications of ring resonators require such costly installations of conventional suppressor mirrors that the decrease in cost of using an aberrated mirror greatly outweighs the 10 percent decrease in performance of an aberrated mirror.

The aberrations can be produced in a number of ways. In the preferred embodiment, the aberrations are created on an aluminum substrate by standard machine-shop cosmetic polishing techniques, including sandpaper and increasingly fine polishing compounds.

Although the invention has been described in terms of a preferred embodiment, it will be obvious to those skilled in the art that many alterations and modifications may be made without departing from the invention. For example, for shorter wavelengths and for narrower beams, the undulations on the surface of the aberrated mirror will be significantly smaller and narrower than the undulations disclosed above. Accordingly, it is intended that all such alterations and modifications be included within the spirit and scope of the invention.

We claim:

1. A reverse wave suppressor mirror apparatus, the improvement comprising mirror surface undulations of a periodic height and width wherein a reverse wave is effectively reinjected in the direction of a forward wave of the apparatus over a wide range of mirror tilt angles from approximately 50 microradians to at least 600 microradians.

2. A reverse wave suppressor mirror apparatus for suppressing a reverse wave beam with a wavelength between 100 nanometers and 100 microns and a beam diameter between 1 millimeter and 1 meter, comprising: a mirror with a surface containing a plurality of undulations 1 to 10 wavelengths high and 0.01 to 0.5 beam diameter wide, wherein the undulations are of a periodic height and width and are placed across the surface of the mirror.

3. A reverse wave suppressor mirror apparatus for suppressing a reverse wave beam wherein the wavelength of the beam is about 3 microns and the beam diameter is about 2 centimeters comprising: a mirror with a surface containing a plurality of undulations between 3 to 10 microns high and between 1 to 5 millimeters wide, and wherein the undulations are of a periodic height and width and are placed across the surface of the mirror.

* * * * *